United States Patent [19]
Le Rouax

[11] 3,897,040
[45] July 29, 1975

[54] ANNULAR BLOWOUT PREVENTER WITH VARIABLE INSIDE DIAMETER

[75] Inventor: Robert K. Le Rouax, Houston, Tex.

[73] Assignee: Hydril Company

[22] Filed: Nov. 16, 1973

[21] Appl. No.: 416,376

Related U.S. Application Data

[60] Continuation-in-part of Ser. No. 359,443, May 11, 1973, abandoned, which is a division of Ser. No. 248,119, April 27, 1972, abandoned.

[52] U.S. Cl. .................. 251/1; 166/84; 277/71; 277/127
[51] Int. Cl. .................................... E21b 33/06
[58] Field of Search ............ 251/1; 277/73, 71, 126, 277/34, 127, 129, 181, 185, 188, 235; 166/81–84, 86, 88, 97

[56] References Cited
UNITED STATES PATENTS

| | | | |
|---|---|---|---|
| 2,035,925 | 3/1936 | Seamark | 277/34 |
| 2,171,049 | 8/1939 | Simmons | 277/188 X |
| 2,368,928 | 2/1949 | King | 166/10 |
| 2,609,836 | 9/1952 | Knox | 277/73 |
| 2,746,781 | 5/1956 | Jones | 277/181 X |
| 2,780,294 | 2/1957 | Loomis | 166/203 |
| 2,846,178 | 8/1958 | Minor | 251/1 |
| 3,038,542 | 6/1962 | Loomis | 166/204 |
| 3,572,628 | 3/1971 | Jones | 251/1 |

Primary Examiner—Martin P. Schwadron
Assistant Examiner—Richard Gerard
Attorney, Agent, or Firm—Pravel & Wilson

[57] ABSTRACT

An annular blowout preventer having a variable inside diameter capable of sealing off a bore or around an object against high well pressures, for use as a normally full-open bore preventer which is urged by pressure to a smaller diameter to seal around a pipe or other object in the well or to fully close off the bore when no object is disposed therein.

12 Claims, 9 Drawing Figures

ANNULAR BLOWOUT PREVENTER WITH VARIABLE INSIDE DIAMETER

CROSS-REFERENCE TO RELATED APPLICATION

This application is a continuation-in-part of my copending patent application Ser. No. 359,443, filed May 11, 1973, and now abandoned which was a division of patent application Ser. No. 248,119, filed Apr. 27, 1972, and now abandoned.

BACKGROUND OF THE INVENTION

The field of this invention is blowout preventers for oil wells and the like.

Annular blowout preventers made by the Hydril Company, an example of which is shown on page 2742 of the "Composite Catalog" for 1970–71, have been in extensive commercial use for a number of years. Such blowout preventers provide a fully-open bore therethrough so that drill, bits, reamers, casing hangers and other large diameter tools can freely pass therethrough, but when actuated to the close position, the packing of each such preventer is forced inwardly to reduce its bore and automatically adjust its size and shape in sealing contact with whatever object happens to then be in the bore of the preventer, thereby closing off the annular space around such object to prevent a blowout of well pressure from below. If no tool is in the well, the bore of the preventer can be fully closed to prevent a blowout.

Although such Hydril blowout preventers are very satisfactory for relatively low well pressures in the range of from about 2,000 p.s.i. to 5,000 p.s.i., it is generally desirable to use a ram type blowout preventer above such pressures, and above 10,000 p.s.i. well pressure, it is generally considered essential to use a ram type blowout preventer.

Further, annular strippers heretofore known have likewise had very limited variations in their bore size and their ability to hold high well pressures.

SUMMARY OF THE INVENTION

The present invention relates to annular blowout preventers wherein a resilient sealing portion for closing a well bore or sealing with a pipe or other object disposed in the bore has a variable bore diameter and wherein anti-extrusion means are mounted with the sealing portion to prevent extrusion thereof over a relatively large variable range of bore diameters for the preventer, whereby the blowout preventers of this invention may be in the form of a stripper or a normally fully open bore preventer, and are yet capable of sealing off much higher well pressures than with prior known annular blowout preventers.

DESCRIPTION OF THE PREFERRED EMBODIMENTS

In the drawings, the letter B refers generally to the form of the blowout preventer of this invention shown in FIGS. 1–7. Briefly, the preventer B includes a housing H which has a central longitudinal bore 10 through which a pipe P or other object is adapted to extend in the known manner for well operations. The housing H is constructed so that it is positioned in a stack of blowout preventers or in a string of well casing or pipe in any suitable manner, as will be well understood by those skilled in the art. The blowout preventer B has a replaceable assembly A, the details of which will be described hereinafter, which has a central longitudinal bore 11 which is preferably at least as large as the central opening or bore 10 and which is likewise substantially the same size or at least as large as the bore of the casing or pipe above and below the preventer B so that a full opening bore 11 is available for the passage of the pipe P during normal operations.

Considering the details of the blowout preventer B, the housing H may take numerous forms, but as illustrated in the drawings, it includes a lower housing section 12 having a housing recess 12a for receiving the blowout preventer assembly A, and an annular piston 14 formed of rubber or similar material, as will be further explained. The recess 12a is further defined by a housing section or cover 15 which is secured to the housing section 12 by bolts 15a (FIG. 1) or other suitable securing means. Fluid pressure lines 12b and 15b communicate through the housing H with the recess 12a for the inlet and relief of fluid pressure with respect to the resilient piston 14 to control the opening and closing of the blowout preventer B, as will be more evident hereinafter. For connecting the housing H in a stack of blowout preventers, or to suitable flanges of the well pipe or casing above and below the blowout preventer B, connecting threaded studs 12c and 15c are preferably provided, although any other suitable connecting means may be employed. The connecting studs 15c are preferably disposed longitudinally in alignment with the connecting studs 12c, although this is not essential.

The replaceable assembly A includes an annular yieldable sealing element or member 30 formed of rubber or other similar yieldable material. An upper anti-extrusion means 31 is provided with the seal member 30, and a lower anti-extrusion means 32 is also provided with the seal member 30, as will be more fully explained. The seal member 30 is actually a part of the entire sealing means for providing sealing engagement with the pipe P, or other object in the well bore or even with itself to close off flow through the bore 11.

The upper anti-extrusion means 31 is identical to the lower anti-extrusion means 32 in the preferred form of the invention, except that they are upside down with respect to each other. Therefore, the details of the anti-extrusion means 31 will be hereinafter explained and the same parts will be identified and explained briefly with respect to the anti-extrusion means 32.

The upper anti-extrusion means 31 includes a plurality of primary segments 35 formed of metal or other similar relatively rigid material which are secured to the upper part of the rubber or other yieldable material of the sealing member 30. Preferably, such primary segments 35 are embedded and molded into the rubber or other yieldable material of the sealing member 30. The sealing member 30 is preferably formed with an inner surface 30a which is generally cylindrical in shape although it may be dished out so as to be concave. The primary segments 35 are arranged in a generally circular manner as partially seen in FIG. 3 and they are positioned so that their inner ends 35a are arranged in a cylindrical manner in alignment with the cylindrical surface 30a therebelow. The radius of such cylindrical surface which is thus formed may be varied, depending upon a particular range of well pipe or objects which are to be sealed, as will be more evident hereinafter. The inner surface 35a of each of the primary segments 35 is adapted to engage the pipe or other object P when the yieldable material of the sealing member 30 has been moved into sealing position so that such segments 35 act to prevent upward longitudinal extrusion of the yieldable material (FIG. 4), as will be more evident hereinafter. Since the primary segments 35 are secured to and are preferably molded with the seal member 30, they move radially inwardly and outwardly as the seal member 30 is urged inwardly and outwardly, as will be more fully explained.

Figure 5:
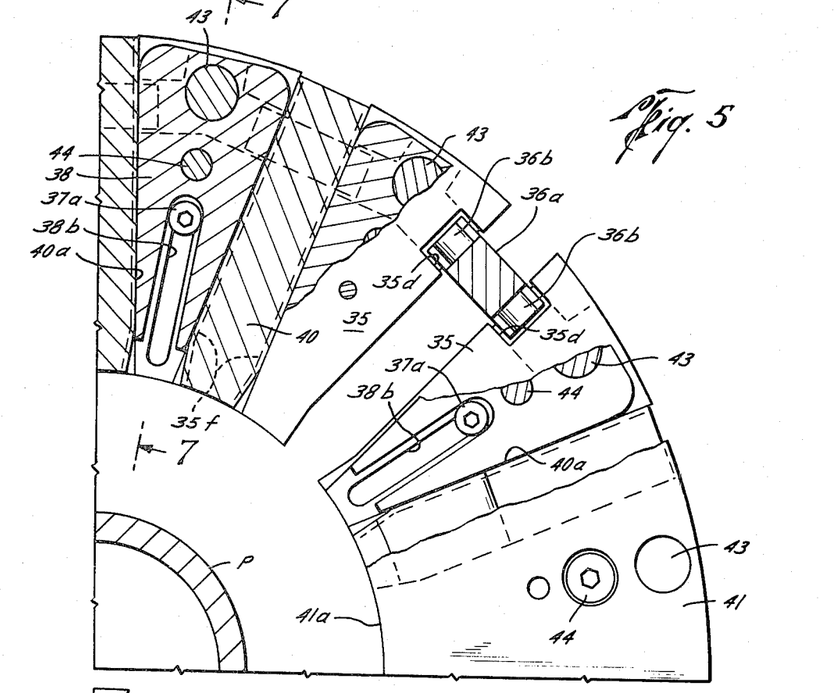
FIG. 5 is a horizontal enlarged view taken on line 5—5, with some parts in section and with certain parts removed to further illustrate the details of the blowout preventer of this invention in the open position of FIG. 1.
Figure 7:
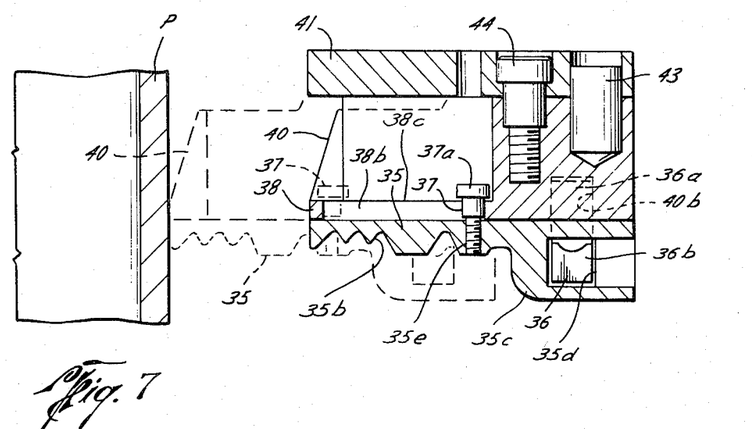
FIG. 7 is a sectional view taken on line 7—7, and it includes a dotted line portion illustrating the closed position of the blowout preventer in engagement with a pipe in the well for sealing purposes.

Although the primary segments 35 may have various configurations, the preferred configuration is shown in detail in FIG. 7 and it includes a plurality of grooves 35b which facilitate the embedding and holding action of each of the segments 35 in the rubber or other yieldable material of the seal member 30. The outer portion of each segment 35 is formed with an enlargement 35c having a key-receiving pocket 35d formed therein for receiving one leg of a generally T-shaped key 36 (FIGS. 5 and 7). Each primary segment 35 is also formed with a threaded opening 35e for receiving a retaining screw or bolt 37 having an enlarged head 37a, the purpose of which will be explained.

The anti-extrusion means 31 further includes a plurality of guide members 38 which are generally coincidental with the primary segments 35 therebelow, but of a slightly smaller size so as to receive therebetween secondary segments 40 in overlapping relationship with the edges of the adjacent primary segments 35. For the purposes of illustration, parts of the segments 40 and the guide members 38 have been removed in FIGS. 5 and 6. It is to be noted that the vertical sides 40a of each of the secondary segments 40 extend beyond the side edges 35f of the adjacent primary segments 35, at all times, and as the segments 35 and 40 move from the open or retracted position (FIG. 5) to the sealing position (FIG. 6), the overlap of the secondary segments 40 with the adjacent edges of the primary segments 35 increases.

Figure 1:
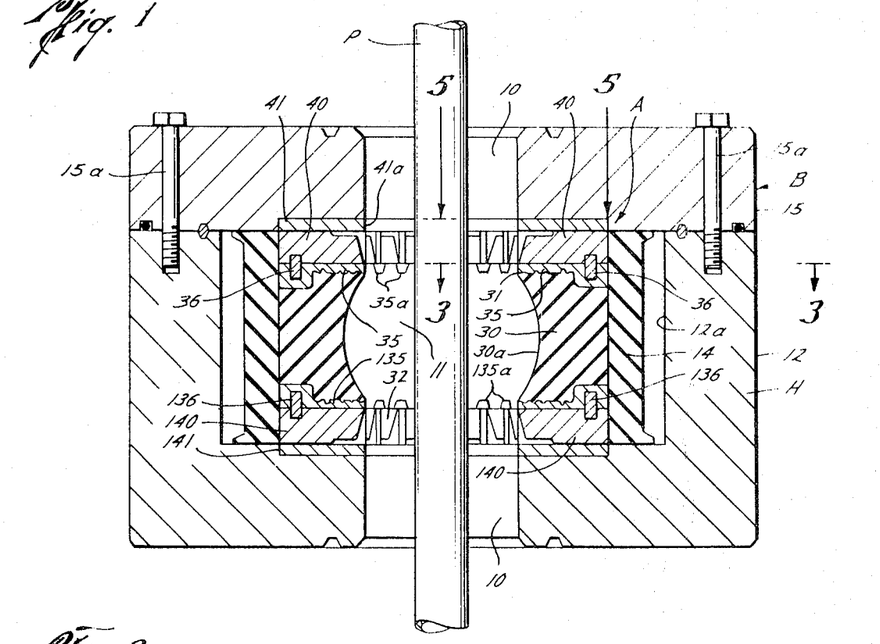
FIG. 1 is a vertical sectional view of one embodiment of the blowout preventer of this invention, illustrating the preventer in the normally open position with the full bore available for the passage of a pipe or other object therethrough.
Figure 2:
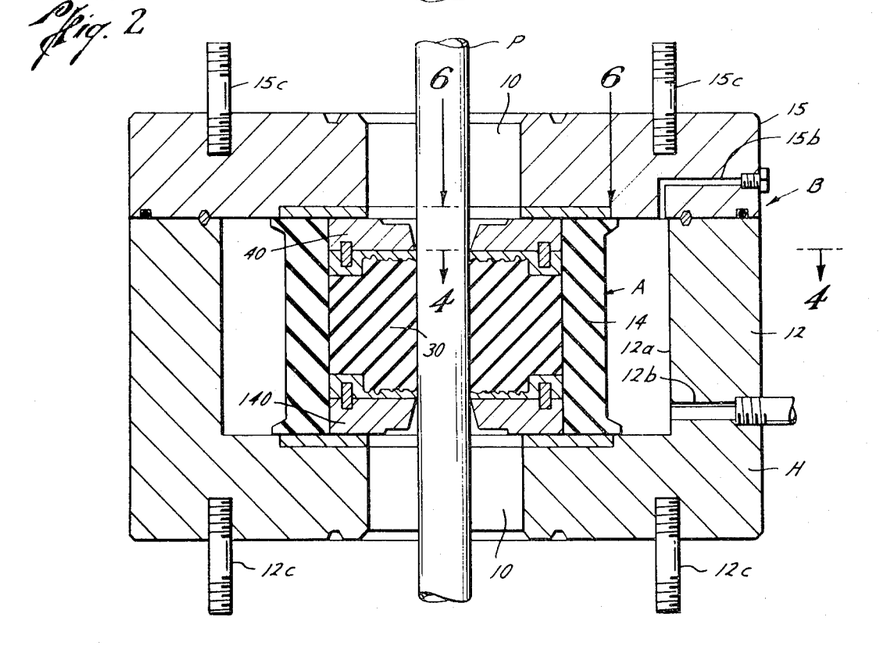
FIG. 2 is a view similar to FIG. 1 taken on line 2—2 of FIG. 4 and illustrating the blowout preventer in the closed or sealing position.
Figure 6:
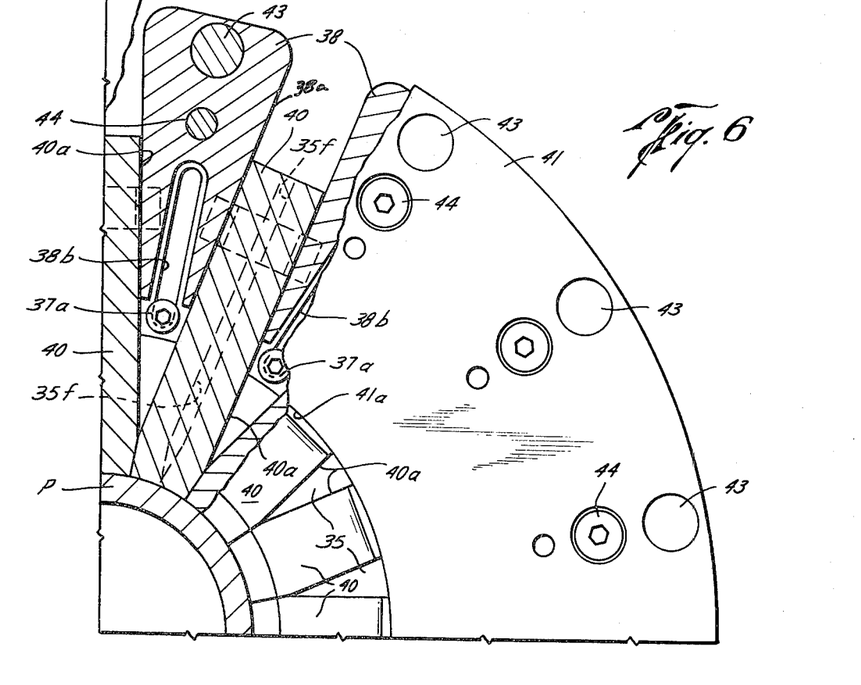
FIG. 6 is the view corresponding to that of FIG. 5, but showing the parts in the closed position of FIG. 2.

A generally circular upper retainer plate or ring 41 is disposed above the upper guide wedges 38 and the upper secondary segments 40. Such upper retainer plate 41 preferably formed of steel or other metal and its inner cylindrical surface 41a is generally coincidental with the inner edges 35a of the primary segments 35 when they are in the open position (FIGS. 1 and 5). The guide members 38 are connected to the upper retainer plate 41 by a plurality of dowel pins 43 (FIGS. 5, 6 and 8), and also a plurality of cap screws 44. The dowel pins 43 take substantially all of the forces involved during the movements of the parts to and from the sealing position. Because the retainer plate 41 is a unitary member and its movement is prevented by the housing H, the wedge guide members 38 are confined with the retainer plate 41 and are prevented from movement. The primary segments 35 and the secondary segments 40, on the other hand, are free to move inwardly relative to the retainer plate 41 and the guide members 38, which results in the yieldable material of the annular sealing member 30 moving inwardly to engage the pipe or other object within the bore of the preventer and with the primary and secondary segments 35 and 40 moving with the yieldable material of the sealing member 30 to maintain their relative position above the yieldable ring 30 at all times for thereby preventing longitudinal extrusion of the yieldable material of the ring 30 when it is in sealing engagement with the pipe or other object (FIG. 6). During the relative movement of the secondary segments 40 with respect to the wedge members 38, the sides 40a of each secondary segment 40 engage the sides 38a of each wedge member 38 so that the radial inward movement of the secondary segments 40 is assured. The rubber or other yieldable material of the sealing member 30 extends upwardly and outwardly behind each of the secondary segments 40 so as to urge them inwardly along with the primary segments 35. To be sure that the upper secondary segments 40 retract with the sealing member 30 as it is moved from the sealing position (FIG. 6) to the retracted position (FIG. 5), the keys 36 connect the primary segments 35 to the secondary segments 40. As previously explained, each key 36 is substantially T-shaped with its vertical portion 36a extending upwardly into a suitable slot 40b (FIG. 8) in the secondary segment 40 thereabove. The lateral legs 36b of each key 36 extends into the slots 35d of the adjacent primary segments 35 (FIGS. 5 and 7).

The retainer screws 37 which are threaded into the primary segments 35 extend upwardly into slots 38b having a shoulder 38c over which the head 37a extends. Such slidable connection between each primary segment 35 and its wedge member 38 thereabove serves to interconnect the primary segments 35 to the wedge members 38 and thus to the retainer plate 41 so that in the event damage occurs in the well to the rubber or other yieldable material of the sealing ring 30, the segments 35 will not fall into the well. Secondarily, there is some guiding action provided by the cap screws 37 moving in the slots 38b as the primary segments 35 move radially relative to the guide members 38.

It should be noted that the inner curved surface 35a of each of the primary segments 35 has a radius which would perfectly engage only one external radius of a pipe P disposed in the bore of the preventer. To provide some variability with respect to that contact, the inner surfaces 35a of the segments 35 may be coated with Teflon or other yieldable material so that they can more accurately conform to the external surface of pipes P of different diameters. However, in normal operations, the variation in such surfaces is not sufficient to be concerned about so that there is essentially a steel to steel contact between the segments 35 and the external surface of the pipe P when the rams R are in the sealing position with the yieldable material of the sealing ring 30 in sealing engagement with the external surface of the pipe P.

The lower anti-extrusion means 32 is not illustrated in detail since the parts thereof are preferably identical to those described heretofore in connection with the upper antiextrusion means 31, except that they are upside down with respect to each other. Briefly, as seen in FIG. 1, the lower anti-extrusion means 32 has its parts identified with the same letters and numerals as the upper anti-extrusion means 31, except that the prefix "1" is placed in front of the numbers for the lower anti-extrusion means 32. Thus, the same general arrangement for the lower primary segments 135 is provided as is provided for the upper primary segments 35, and they are interconnected with suitable keys 136 to secondary segments 140. A plurality of wedge guide members corresponding to the guide members 38 are provided between the secondary segments 140 and these are connected to the lower retainer plate or ring 141 which corresponds with the upper retainer plate or ring 41.

In the operation or use of the blowout preventer B of this invention, the blowout preventer normally is fully open as illustrated in FIG. 1 for performing well operations through its bore 11. Such open or retracted position is obtained so long as the pressure in the recess 12a is low enough so that it does not urge the piston 14 radially inwardly.

When the blowout preventer B is to be used for sealing around the pipe P or for closing the bore 11 by sealing with itself, fluid under pressure is introduced into the recess 12a through line 12b or 15b to squeeze the flexible piston ring 14 radially inwardly to thereby force the resilient ring 30 radially inwardly into sealing engagement with the external surface of the pipe P. However, line 15b is normally a vent with the pressure being introduced through pressure line 12b, with suitable controls externally of both (not shown).

At the same time, the primary segments 35 and 135 as well as the secondary segments 40 and 140 move radially inwardly with the ring 30 until they engage the external surface of the pipe P. When the primary and secondary segments have thus engaged the pipe P, the rubber or other yieldable material of the seal ring 30 is confined and is prevented from extruding longitudinally along the length of the pipe P. This makes it possible to hold extremely high pressures above and below the preventer.

Figure 8:
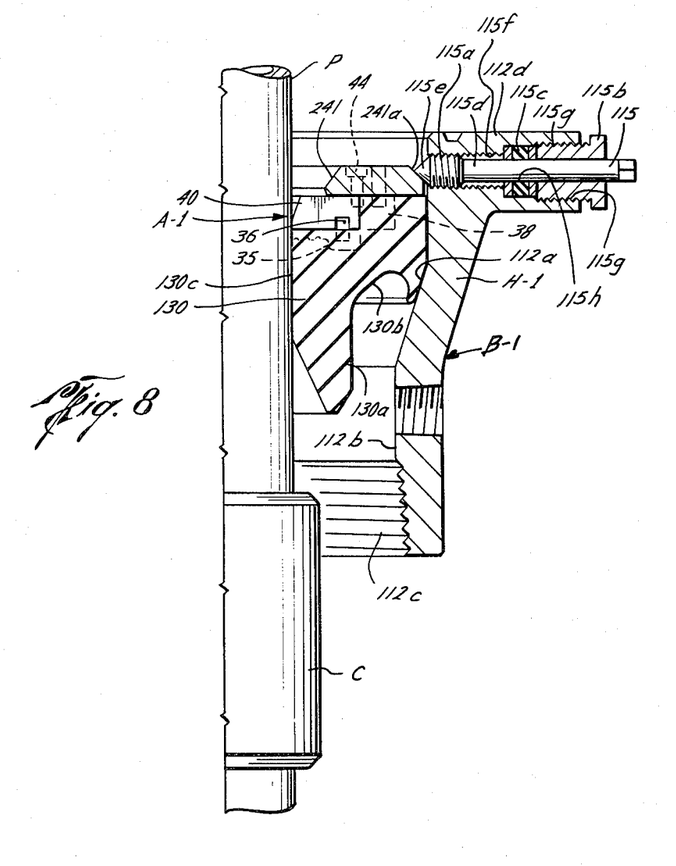
FIG. 8 is a vertical sectional view of a modified annular blowout preventer of this invention which is in the form of a stripper normally engaged by the pipe and expanded by the pipe itself as the pipe moves through the stripper.

As explained in particular in connection with the blowout preventer B-1 of FIG. 8, in some instances, it may be desirable to use only the upper anti-extrusion means 31, to seal against upward extrusion forces from well pressure.

Figures 3, 4:
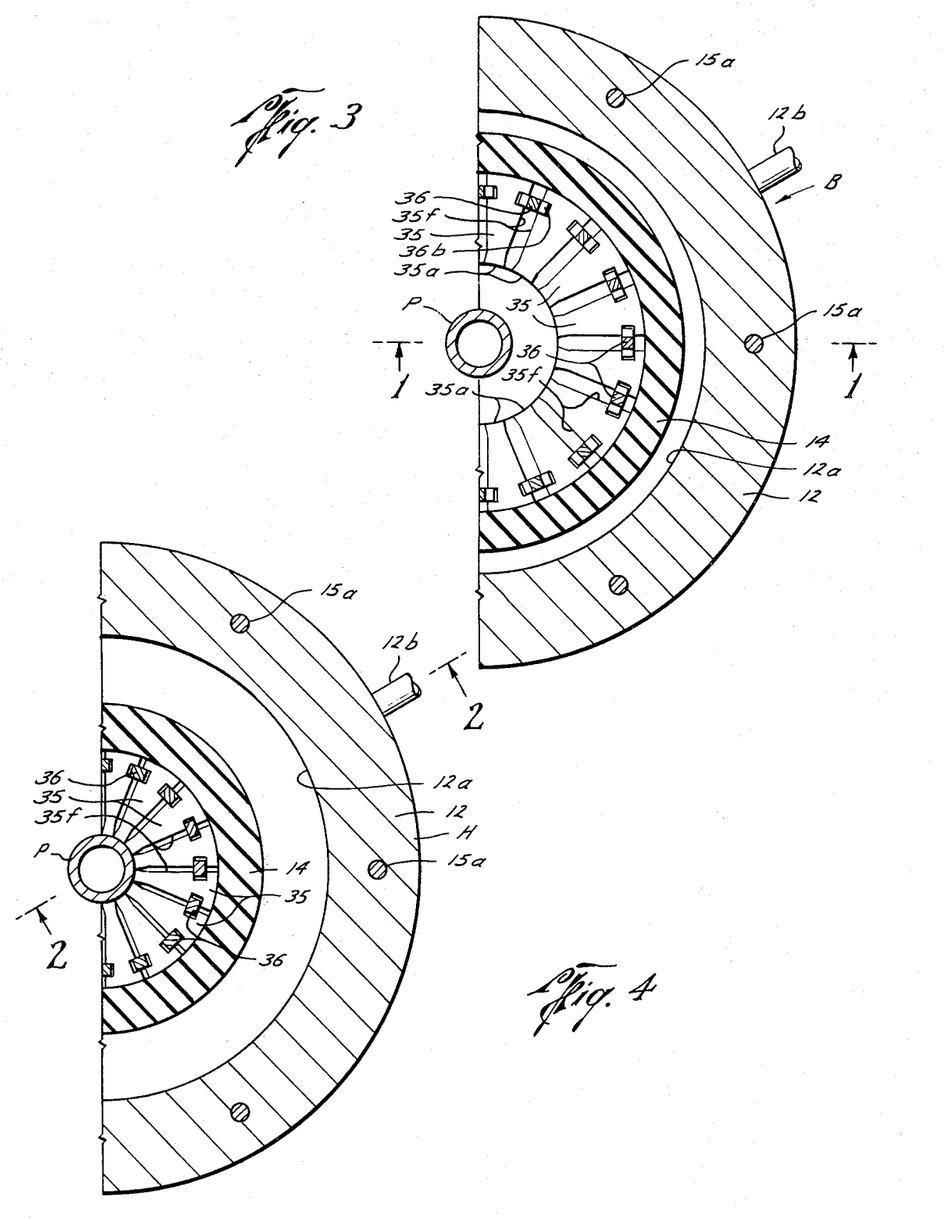
FIG. 3 is a horizontal sectional view taken on line 3—3 of FIG. 1.
FIG. 4 is a sectional view taken on line 4—4 of FIG. 2 to further illustrate the blowout preventer in the closed sealing position of FIG. 2.

When it is desired to release the sealing ring 30 from its sealing position, the fluid pressure acting on the piston ring 14 is relieved through line 15b or 12b to relieve the pressure on the seal ring 30 so that the inherent resiliency of such piston 14 and ring 30 return them to their open or retracted position (FIG. 1). Thus, the elasticity of the materials such as rubber of the seal ring 30 and the piston 14 cause them to return to their normal undistorted condition (FIG. 1) as the fluid pressure in the recess 12a is relieved. The retraction of the sealing member 30 causes the primary segments 35 and 135 to also retract radially to their nonsealing position (FIG. 3). The secondary segments 40 and 140 are forced to retract with the primary segments 35 and 135 because of the interconnections of the keys 36 and 136, respectively, as previously explained.

FIG. 6 illustrates the metal to metal contact of the secondary segments 40 with the external surface of the pipe P when the seal member 30 is in sealing engagement with the external surface of the pipe P. In FIG. 4, the secondary segments 40 have been shown in their extreme innermost position, which is the limit of travel and effective sealing action with the particular construction illustrated in the drawings. It will be understood that effective sealing action may be accomplished from such innermost position of FIG. 4 to any pipe diameter outwardly to the diameter formed by the inner segment surfaces 35a (FIG. 3). Thus, there is a variable inside diameter range for effective sealing with each specific blowout preventer construction. The extent of such variation depends upon the particular configuration and the radius of curvature of the inner segments of the anti-extrusion means 31 and 32. In fact, the arrangement of the primary and secondary segments of both of the anti-extrusion means 31 and 32 may be constructed so that the diameter of the opening formed by such segments in their innermost sealing position is small enough so that there is sealing and anti-extrusion protection even when nothing is in the bore of the preventer and the sealing is accomplished by the closing of the bore 11 by contacting the inner surface 30a with itself.

The anti-extrusion means of this invention is also effective when sealing with a kelly or other object which does not have a cylindrical external surface such as the pipe P. The rubber or other yieldable material of the seal members 30 is distorted into sealing engagement with the external surface of the kelly, and the anti-extrusion segments move into contact at some parts of the external surface of the kelly, but because of the circular arrangement thereof, they cannot contact fully throughout the full external surface of the kelly. However, the area which is left exposed is relatively small and therefore the anti-extrusion means 40 provides support throughout substantially the full area in which the seal element 30 extends for the sealing action.

FIGS. 3 and 4 illustrate the movement of the upper primary segments 35 from the open or retracted position (FIG. 3) to the sealing position (FIG. 4) where the inner edges 35a are in metal to metal contact with the external surface of the pipe P to prevent longitudinal extrusion of the rubber or other sealing material of the seal member 30. It will be understood that the lower primary segments 135 move similarly to the segments 35 and therefore also effect a metal to metal contact with the pipe P.

However, it should be noted that the upper segments 35 and 40 may move independently of the lower segments 135 and 140 from the position of FIG. 3 to the sealing position of FIG. 4, so that sealing and metal to metal contact by the segments may be effected at a pipe or object even though the diameter of the object is different in proximity to the upper segments than it is in proximity to the lower segments. For example, if a pipe joint or collar is disposed in the bore of the preventer when it is desired to close off the bore, and with the upper edge of the joint or collar below the upper segments 35 and 40 but above the lower segments 135 and 140, distortion and sealing of the seal member 30 with the pipe and collar is effected, metal to metal contact of the upper segments 35 and 40 with the pipe is effected for preventing upward longitudinal extrusion of the seal member 30, and metal to metal contact of the lower segments 135 and 140 with the collar is effected for preventing downward longitudinal extrusion of the seal member 30.

It will also be understood that the same type of sealing action occurs at any intermediate location or radial position of the segments between the open position of FIG. 3 and the smallest diameter sealing position of FIG. 4. The secondary segments 40 and 140 prevent extrusion of the sealing material of the seal member 30 beyond the radial gaps between the primary segments 35 and 135, respectively.

It will also be understood that the smallest diameter sealing position of FIG. 4 is merely illustrative and may be varied. If desired to provide a "blind" seal with the anti-extrusion action of this invention the inner edges of all of the segments would essentially meet at the innermost sealing position so that there would essentially be no central opening.

In FIG. 8, a modified form of the blowout preventer B–1 is illustrated which is intended for use as a stripper. The blowout preventer B–1 includes a housing H –1 which is in the form of an annular seat with a tapered seating surface 112a and with a longitudinal inner bore 112b. The housing or annular seat H-1 is adapted to be connected in a well casing in the known manner with its lower threads 112c threaded to a section of casing therebelow, and with its upper flange 112d connected by bolts (not shown) or other suitable means to a corresponding flange on a section of well casing or pipe or other piece of apparatus thereabove.

A hold-down member 115 having threads 115a is threaded into a threaded opening 115f for inward and outward adjustment. An insert 115b is threaded into a threaded section 115g of the opening 115f in the flange 112d. The insert 115b is a packing nut which compresses suitable packing 115c to seal around the hold-down shaft 115d. The inner pointed end 115e of the hold-down member 115 is adapted to engage a modified upper retainer plate 241, which has an annular beveled surface 241a which is engaged by the pointed inner end 115e of the hold-down member 115. When the blowout preventer B–1 is in the seated position of FIG. 8, it should be understood that a plurality of such hold-down members 115 are utilized in the preferred form of this invention at spaced circumferential points in substantially the same plane so as to hold the blowout preventer B–1 in its seated position in the seat or housing H–1.

The blowout preventer B–1 has a modified sealing ring or member 130 formed of rubber or other resilient material for sealing engagement with the external surface of the pipe P. The lip section 130a provided by the recess 130b serves to facilitate the outwardly radial yielding of the resilient material of the sealing ring 130 when the pipe P and any collar C therewith is forced through the bore 130c of the sealing ring 130, as will be more evident hereinafter. The replaceable anti-extrusion means A–1 is preferably identical with the anti-extrusion means A illustrated and disclosed herein with respect to the upper portion of the blowout preventer B. Therefore, the same numerals and/or letter designations are shown in FIG. 8 as in FIGS. 1–7 for such parts of the anti-extrusion means A and A–1, and it will be understood that they are essentially the same and operate in the same manner. The only exception is with respect to the retainer plate 241 which is modified as heretofore explained and as seen in FIG. 8, as compared to the retainer plate 41.

In the operation or use of the blowout preventer or stripper B–1 of FIG. 8, the internal bore 130c is preformed at a predetermined size so that pipes P of a predetermined external diameter may be forced therethrough and sealed therewith so as to prevent the escape of fluid pressure upwardly around the blowout preventer B–1. The blowout preventer B–1 yields radially segments to permit the passage of enlargements such as the collar C, while still providing a full seal around the external portion of the pipe P at its normal diameter, as illustrated in FIG. 8. When the blowout preventer B–1 is forced outwardly by an enlargement such as the collar C, or an enlarged diameter of pipe, the inner bore 130c is expanded or forced outwardly by the action of the pipe or other object passing through such bore 130c and such outward expansion carries with it the primary anti-extrusion segments 35, and the secondary segmeents 40 thereabove so that the same metal-to-metal contact with the external surface of the pipe P by such segments 35 and 40 is maintained at all times as heretofore described in connection with the segments 35 and 40 of the assembly A.

Since the stripper B–1 is used for circumstances which require only the prevention of the well pressure escaping around the pipe to the area thereabove, only the single upper anti-extrusion means or assembly A–1 is required and is utilized with the blowout preventer B–1. However, as illustrated by the modified apparatus shown in FIG. 9, both an upper anti-extrusion assembly A–2 and a lower anti-extrusion assembly A–3 could be used with a stripper or sealing member 230 for other applications wherein it is desired to also control the anti-extrusion of such sealing member 230 with respect to pressures acting from above the blowout preventer B–1. Thus, like parts in FIGS. 8 and 9 have the same numerals and/or letters. The annular housing H-2 is basically the same as the housing H–1, although it is shown as slightly different in shape for receiving an annular retainer 341 on an annular tapered seating surface 212a. The retainer 341 has a laterally extending annular upper portion 241a with a beveled surface 341b and a laterally extending annular lower portion 341c.

Figure 9:
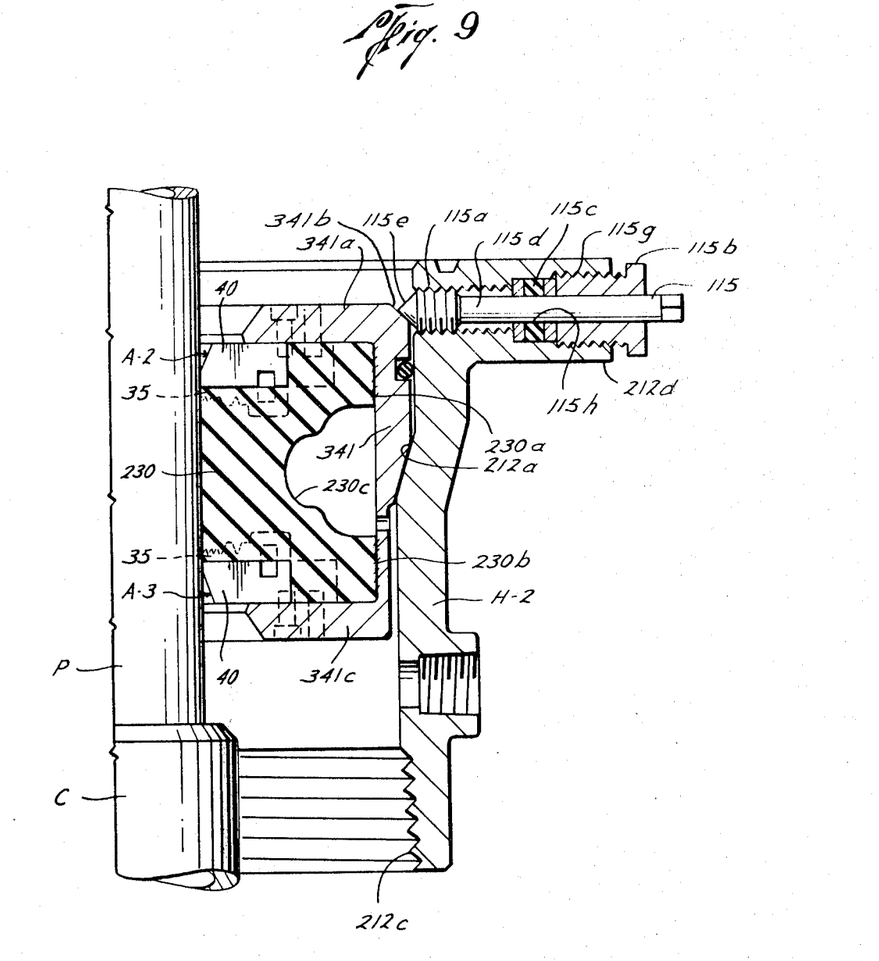
FIG. 9 is a view similar to FIG. 8, but showing a modified form thereof having both an upper and a lower antiextrusion means.

The retainer 341 is releasably locked in place by the hold-down member 115 as in FIG. 8.

The blowout preventer of FIG. 9 has a modified sealing ring 230 formed of rubber or other suitable material which is preferably bonded at annular surfaces 230a and 230b to the retainer 341 and which has an outer cavity or recess 230c therebetween to provide space for the outward lateral or radial displacement of the rubber of the ring 230 when an enlargement such as collar C passes through the stripper in either longitudinally upwardly or downwardly. Each of the anti-extrusion assemblies A-2 and A-3 are of generally the same construction and have the same segments 40 and 35 as described and illustrated in FIGS. 1–8, and therefore, the means A-2 acts to prevent upward extrusion and the means A-3 acts to prevent downward extrusion of the rubber of the sealing member 230.

Thus, in the operation or use of the form of the stripper shown in FIG. 9, the sealing ring 230 remains in sealing contact with the external surface of the pipe P at all times so that fluid cannot flow around the pipe. The upper and lower antiextrusion means A-2 and A-3 are in metal-to-metal contact with the external surface of the pipe P at all times so as to prevent extrusion of the rubber or other material of the ring 230 from being extruded in either longitudinal direction when fluid pressure in the well externally of the pipe P is acting thereon. The seal ring 230 and the anti-extrusion segments 40 and 35 move radially outwardly when an enlargement such as the collar C moves therethrough while maintaining the seal therewith and the contact of the anti-extrusion means with the pipe P at all times.

In FIG. 1, instead of the dished out or concave surface 30a, the shape of the surface 30a or other portions of the sealing member 30 may be modified, or recesses or the like, such as the cavity 230c in FIG. 9, may be provided in the member 30, the purpose of which is to compensate, or partially compensate, for the smaller volume of the space available for the rubber of the member 30 when it is in its sealing position (FIG. 2) as compared to the volume of the space available for such member 30 in its retracted position (FIG. 1).

The foregoing disclosure and description of the invention are illustrative and explanatory thereof, and various changes in the size, shape and materials as well as in the details of the illustrated construction may be made without departing from the spirit of the invention.

I claim:

1. An annular blowout preventer, comprising:
   an annular yieldable sealing means having an inner bore therethrough through which a well pipe or the like is adapted to extend;
   a variable inner diameter upper anti-extrusion means disposed at the upper end of said yieldable sealing means;
   said anti-extrusion means including plural pipe engaging means with said sealing means and overlapping adjacent ones of said pipe engaging means;
   said plural pipe engaging means being movable radially with said sealing means for providing a variable inner diameter thereof for engagement with the external surfaces of well pipes of varying diameters to prevent upward extrusion of said sealing means at each of the varying diameters of the pipes; and
   means for urging said sealing means and said pipe engaging means therewith radially inwardly to various inner diameters for sealing and engaging the pipe engaging means with the pipe.

2. The structure set forth in claim 1, including:
   a housing having an annular lateral recess therein and a central longitudinal bore therethrough for receiving said annular sealing means and said anti-extrusion means in said recess with the inner bore of said sealing means substantially coincidental with said central longitudinal bore; and
   said urging means comprising an annular piston disposed in said recess outwardly of said sealing means for radially urging said sealing means radially inwardly into said central longitudinal bore of said housing.

3. The structure set forth in claim 1, including:
   a variable inner diameter lower anti-extrusion means disposed below said yieldable sealing means and including plural pipe engaging means with said sealing means overlapping adjacent ones of said pipe engaging means;
   said plural pipe engaging means of said lower anti-extrusion means being movable radially with said sealing means for providing a variable inner diameter thereof for engagement with the external surfaces of well pipes of varying diameters to prevent downward extrusion of said sealing means at each of the varying diameters of the pipes.

4. The structure set forth in claim 1, wherein said upper anti-extrusion means includes:
   a plurality of upper primary segments disposed with a gap between adjacent segments and secured to the yieldable material of said sealing means for movement with said yieldable material as it is moved to and from each of said sealing positions; and
   a plurality of upper secondary segments disposed above said primary segments spanning said gap between said adjacent upper primary segments to substantially prevent extrusion of said yieldable material above said gap.

5. The structure set forth in claim 3, wherein said lower anti-extrusion means includes:
   a plurality of lower primary segments disposed with a gap between adjacent segments and secured to the yieldable material of said sealing means for movement with said yieldable material as it is moved to and from each of said sealing positions;
   a plurality of lower secondary segments disposed below said lower primary segments and spanning said gap between said adjacent lower primary segments to substantially prevent extrusion of said yieldable material below said gap.

6. The structure set forth in claim 4, wherein said upper anti-extrusion means includes:
   upper guide means disposed above said upper primary segments and between and in guiding contact with each pair of said upper secondary segments.

7. The structure set forth in claim 5, wherein said lower anti-extrusion means includes:
   lower guide means disposed below said lower primary segments and between and in guiding contact with each pair of said lower secondary segments.

8. The structure set forth in claim 6, including:
   an upper retainer plate secured to said upper guide means.

9. The structure set forth in claim 7, including:
   a lower retainer plate secured to said lower guide means.

10. The structure set forth in claim 4, including:

upper connector means connecting said upper primary and secondary segments together to effect a return of said secondary segments with said primary segments when said yieldable material is returned to an open bore position from said sealing position.

11. The structure set forth in claim 5, including:

lower connector means connecting said lower primary and secondary segments together to effect a return of said secondary segments with said primary segments when said yieldable material is returned to an open bore position from said sealing position.

12. The structure set forth in claim 4, wherein:

said primary and secondary segments of said upper anti-extrusion means are disposed substantially circularly; and an upper wedge-shaped guide member disposed adjacent each of said upper secondary segments in said upper anti-extrusion means.

* * * * *